United States Patent [19]
Jones

[11] Patent Number: 4,760,318
[45] Date of Patent: Jul. 26, 1988

[54] INTERMITTENT SINGLE ROTATION MOTOR ACTUATOR

[75] Inventor: J. Paul Jones, Glenmore, Pa.

[73] Assignee: Patent Researach & Development Corp., Exton, Pa.

[21] Appl. No.: 917,005

[22] Filed: Nov. 28, 1986

[51] Int. Cl.[4] ......................... H02P 3/08; H02K 13/00
[52] U.S. Cl. ..................................... 318/362; 318/491; 318/541
[58] Field of Search ............... 318/292, 337, 346, 360, 318/361, 362, 429, 491, 538, 539, 541, 542, 558

[56] References Cited

U.S. PATENT DOCUMENTS

| | | | |
|---|---|---|---|
| 3,466,482 | 9/1969 | Peters | 318/292 X |
| 3,474,318 | 10/1969 | Fougeront | 318/292 |
| 4,095,155 | 6/1978 | Brooks et al. | 318/292 X |

FOREIGN PATENT DOCUMENTS 60-59988  4/1985  Japan ..................................... 318/361

Primary Examiner—Bentsu Ro

[57] ABSTRACT

A conventional three pole D.C. motor has a third placed at an acute angle of 60 degrees to one of the normal brushes and positioned to contact the commutator plates. A motor energizing circuit is normally off and is capable of energizing the normal brush and, alternately, the third brush which is displaced 60 degrees from the normal brush. A single intermittent rotation begins with the normal brush being energized, and continues in a conventional manner until a rotation sensor at approximately 300 degrees cuts off the normal brush and energizes the third brush for a specific period, during which time all armature poles are of opposite polarity to the adjacent field poles; which causes the motor to be magnetically braked at the 360 degree full rotation point. At the end of the braking period, all power is removed until the next intermittent cycle.

3 Claims, 4 Drawing Sheets

INERMITTENT DRIVE AND BRAKING CIRCUIT

INERMITTENT DRIVE AND BRAKING CIRCUIT

POWER AND TIMING DIAGRAM

INTERMITTENT SINGLE ROTATION MOTOR ACTUATOR

This invention in general relates to actuating devices and in particular to a method which is based on a conventional three pole D.C. Motor, with an added brush that is electrically switched to provide silent magnetic braking to a stop position at the end of each single intermittent rotation. The invention is particularly adaptable to miniature D.C. motors, which can, with this invention, be used to drive low average power impulse actuated mechanisms; such as required in many small battery operated medical devices. The invention includes a pick up means which senses the rotation of the shaft at 300 degrees to start the braking, regardless of the loading effects on the motor or variations of its speed.

BACKGROUND

As more and more electronic devices are made with digital controls; and as the devices become smaller and smaller, the need for low to medium force actuators that can operate on low power has steadily increased. There are very few basic mechanisms that are impulse driven and can efficiently translate an electrical pulse into linear mechanical motion. A requirement that the motion be silent makes the design even more difficult, and will eliminate most of the electromechanical devices now being used.

The most common electrical device for deriving linear motion is the solenoid coil, with a moving core plug. It is, however, very inefficient because of large air gaps involved; and it makes a great deal of noise when the iron plug hits bottom. The movement of the center core is very quick, with very little stall force; consequently, it cannot store or integrate its force over a period of time, to transfer the energy relatively slowly into a high inertia load.

There are rotary solenoids which translate a short center core motion, thru balls in a sloped race, into a rotational motion, of the order of 20 to 30 degrees. This type does have the ability to store more energy during the rotation; however, it is still very quick; and it is reciprocal. It must return by spring loading to its original position, which robs it of useable power during the power stroke. This type of solenoid is also very noisy.

It is, therefore, one object of this invention to provide an efficient Rotary D.C. motor like device, which, with an added brush contact to the armature, and suitable drive circuitry, can be used as a relatively silent single turn rotary actuator; which, with the use of a suitable cam or bell crank, can produce a single linear motion with each single electrical impulse.

Most magnetically actuated devices at present, such as the solenoid and the relay type mechanisms, have power curves that are inversely proportional (by square law) to the size of the magnetic air gap. Consequently, the start-up or "stall" power drops off quickly as the required distance of movement increases. Since most impulse devices would work best with maximum applied power up front, or stored for concentrated use relatively late in the drive cycle, the conventional air gap devices are quite out of phase with the requirements.

It is, therefore, another object of the invention to utilize the efficient design of a conventional D.C. motor which (1) has a very small air gap between the armature poles and the field magnets, (2) Has an efficient and relatively slow build up of inertia in the armature as the armature speed builds up and, (3) The energy that is stored in the weight and speed of the armature can be used in a short burst at a later part of the rotational cycle; with greater peak power available at the end of the cycle. Through the use of cams or bell cranks; and without the need of reciprocating back to the start position with spring loading, there is more energy available during the "work" cycle.

In miniature equipment in the medical field, and in particular, the controllers that are used with I.V. infusion sets, the need for dependable silent operation is very important. When the control device is driven in periodic impulses from digital controls, it is usually to save average power, so that small batteries can be used for back-up during power emergencies; or for completely portable operation.

It is, therefore, still another important object of this invention to provide an efficient and relatively silent single turn actuator, which is completely magnetically accelerated and stopped, without mechanical impacts. The life expectancy of the all magnetic actuator, based on even a toy D.C. motor, is at least 10,000 hours; since the impulse operation at typically once per second will be several hundred times the 50 hour life rating at 15,000 revolutions per minute.

A further feature of the invention is the very low cost to produce; since the basic small D/C. motor components are presently being made to very high precision, and in extremely large production quantities.

BRIEF DESCRIPTION OF THE DRAWINGS

FIGS. 1A and 1B FIGS. 3A and 3B show the same relative components as FIGS. 2A and 2B with the extra brush shown, which is used to change the motor to a magnetic brake at the stable 360 degree position.

BASIC THREE POLE D.C.MOTOR OPERATION

Figure 1A:
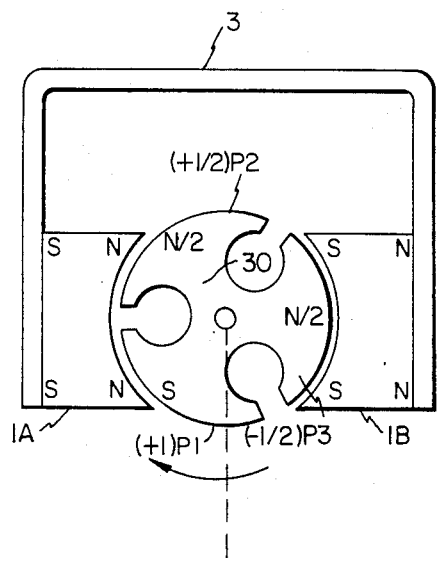
FIGS. 1A and 1B show a typical three pole D.C.Motor, with the magnetic polarities of the three armature poles related to the two permanent magnets which make up the field poles; during a single 60 degree transition of the armature poles.
Figure 1B:
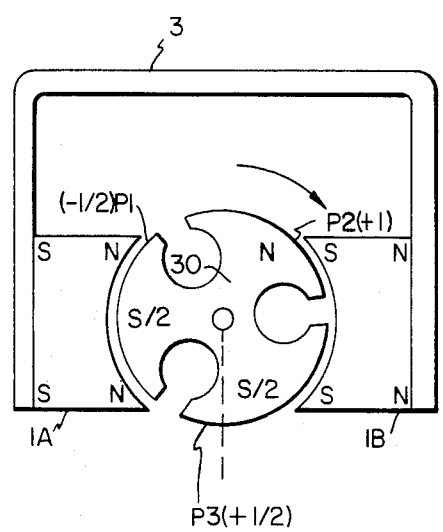
Figure 2A:
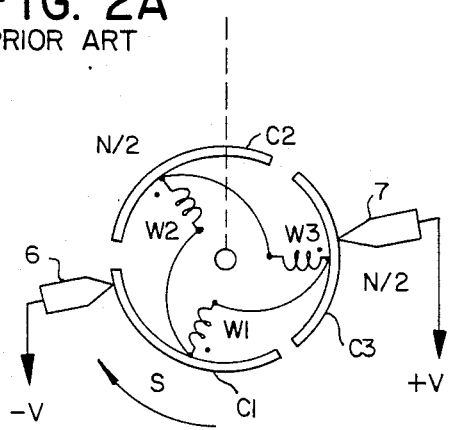
FIGS. 2A and 2B show the relative positions of the three 120 degree commutator plates, the armature windings, and the contact brushes as related to the armature pole positions shown in the corresponding
Figure 2B:
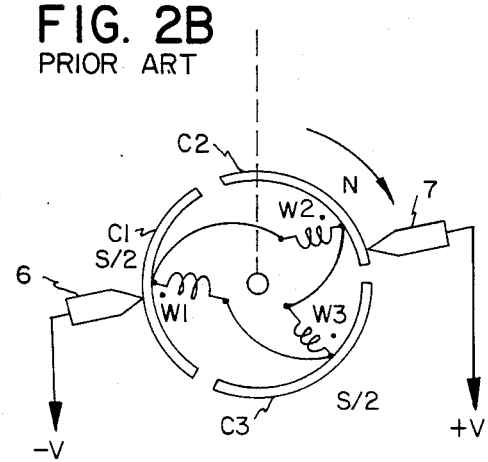

In order to relate the invention to the basic operation of a three pole D.C. motor, FIGS. 1A and 1B show the magnetic polarities of the poles of the armature, directly related to FIGS. 2A and 2B; which show the same relative positions of the commutator sections, the associated pole windings, the field magnets, and the contact brushes on the commutator plates.

In the normal operation of the three pole motor there are six (60 degree each) transitions (TR1, TR2, etc.) of the brush contacts on the 120° commutator plates, for each 360° rotation of the armature. FIGS. 1A and 1B and FIGS. 2A and 2B show the motor at the commutator transition points at the beginning of the sixth 300° transition and the beginning of the next new cycle at 360° (T1).

Figure 3A:
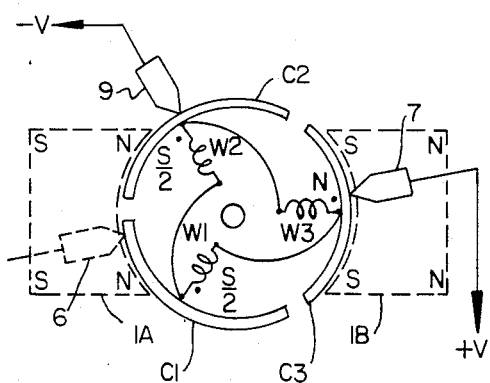
Figure 3B:
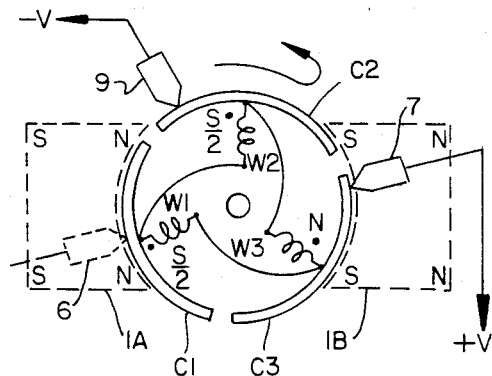
Figure 4A:
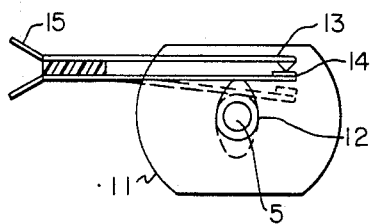
FIG. 4A shows a mechanical leaf spring switch and cam, set to produce a contact at 300 degrees of rotation.
Figure 4B:
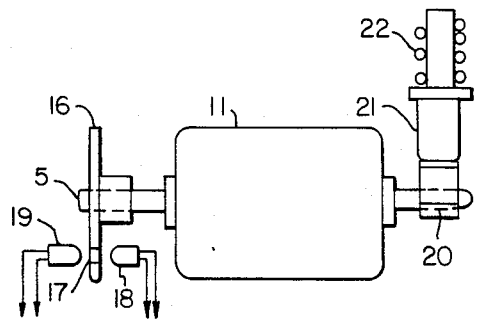
FIG. 4B shows the side view of a timing disc and photo diode pickup, to indicate the specified point of rotation.
Figure 5:
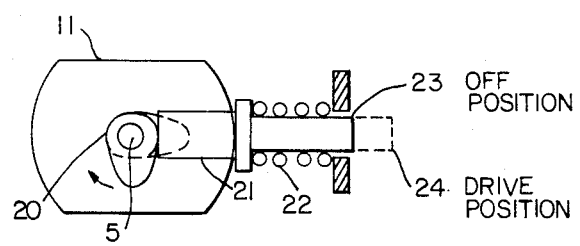
FIG. 5 shows the output drive cam on the motor which drives a reciprocating pin as an actuator.

FIGS. 3A and 3B show the extra brush 9, which is switched ON by external switching circuitry (see FIG. 5). This extra brush contact produces a strong magnetic braking force to the armature at the end of each single 360° rotation of the armature, and locks the armature into the sixth (360°) position before the braking force is released; so that there need be no continuous power applied to the actuator. Furthermore, by using an external sensor on the motor shaft ( See FIGS. 4A and 4B for examples) the braking period can be started (See circuitry in FIG. 5) at the correct angle of rotation (300°) regardless of the actual time variations or changing load conditions on the motor actuator output shaft. This sensor switch, thereby, becomes an important part of the invention.

DETAIL OF ACTUATOR OPERATION

A more complete explanation of the three pole motor operation and the related braking and controlling invention can be given by referring to the polarity changes within the motor, which are shown at the two successive 60° transition points, in FIGS. 1A and 1B and associated FIGS. 2A and 2B.

In FIGS. 1A and 2A the motor is shown at the transition point where the pole P1 of the three pole armature 4 is polarized "south" (S) by the commutator plate C1 in contact with the brush contact 6 switching current through the P1 pole winding W1, which is also connected to the commutator plate C3 and oposite voltage brush contact 7.

Pole P1 and its winding W1 is thereby getting the full applied voltage, and being of south (S) polarity, is in position to be efficiently attracted to the north (N) pole of the permanent field magnet 1A. Field magnet 1A would ordinarily be magnetically coupled to the opposing field magnet 1B by a metal case 3, which acts to conduct the magnetic lines in a series aiding fashion between the two permanent magnets 1A and 1B, which make up the field or "stator" elements. At this point the pole P1 is given a force rating of +1 as its contribution to the clockwise rotation of the armature, since it has the full voltage accross its winding W1.

Simultaneously, Pole P2 is magnetized north (N), which is repelled by the adjacent north (N) pole of the field magnet 1A. This repelling force is also in the direction of the clockwise rotation; however,it only has a force of $+\frac{1}{2}$, since its winding W2 is in series with the winding W3, and both are connected between the −voltage (−V) on commutator plate C1 and the + voltage commutator plate C3; thereby receiving only $\frac{1}{2}$ the current that is in winding W1 of pole P1. At the same time pole P3 is magnetized north (N) to $\frac{1}{2}$ force by being in series with the winding W2. This pole P3 does not aid the rotation of the entire armature, since its its north (N) polarity is attracted to the adjacent south (S) pole of the field magnet 1B. The pole is given a rotational force rating of $-\frac{1}{2}$; however, it has its least holding force when directly alligned with the field magnet 1B, and does not reach its full retarding force until the end of this particular 60° rotational segment. The resultant force is the $+1+\frac{1}{2}-\frac{1}{2}$, or a total of +1 force in a clockwise rotation.

In the next phase, which is the transition at 360° to the start of the next full cycle, FIGS. 1B and 2B show the pole P2 has assumed the same 60° relationship to the south (S) field magnet 1B that the pole P1 had with the field magnet 1A in the prior phase shown in FIGS. 1A and 2A . Pole P3 and P1 then also have the same relationship as poles P2 and P3 in the first example shown in FIGS. 1A and 2A.

The +1 force pole will continue to alternate between the left field magnet 1A and the right field magnet 1B for six successive steps of 60°, to complete the 360° rotation of the armature; with the six step cycle repeated, so long as it is operating as a motor.

The prime object of this invention is to interupt the six step sequence at the end of each complete cycle, and establish a stable "locked-on" position, from which a new cycle can begin, on command. The goal is uniquely accomplished by adding an additional brush contact 9 to the standard contacts 6 and 7, which can be electronically switched, to instantly change the motor from a standard operating state to a "locked-on" state.

DETAIL OF THE BRAKING AND LOCK-ON ACTION

FIGS. 3A and 3B are used to illustrate the braking or "lock-on" state of the motor; when utilizing the added parts, which are the invention. FIG. 3A shows the stable position of the motor at 360° after it has switched to the "braking" state at 300°, which is time TR6 on the timing chart in FIG. 7. This 360° position is the stable lock-on condition, after the motor has expended its residual energy in the overshoot of the braking cycle, at the end of the sixth step. The stressed "overshoot" position is shown beyond 360° in FIG. 3B, just before settling back into the 360° stable lock-on position shown in FIG. 3A.

With reference to FIGS. 1A and 3A, note that the poles P1 and P2 are both magnetized South (S), and mutually attracted to the North (N) field magnet 1A; when the contact 9 is switched ON < and the contact 6 is simultaneously switched off. Also, the (N) pole P3 is directly aligned with the attracting South (S) pole of the right side field magnet 1B. This stable condition, shown in FIG. 3A, adds up to a holding force of 200% of the average running force ( i.e. all three poles are additive, $+\frac{1}{2}, +\frac{1}{2}$, and $+1 = +2$ total).

The 360° lock-on position allows for an overshoot of near 60°, to apply braking force vectors. The armature is shown in the braking overshoot condition, in FIGS. 3B; just before pulling back to the stable condition at 360°, shown in FIG. 3A.

It is not a well known fact that the maximum rotational pull between a pole and the face of a field magnet *does not occur* when the poles are exactly lined up. It is necessary that the poles be "stretched" off center to create the strongest pull or braking force, as shown by the overshoot position in FIG. 3B, when the inertial energy is dissipated.

DESCRIPTION OF DRIVE CIRCUIT OPERATION

Figure 6:
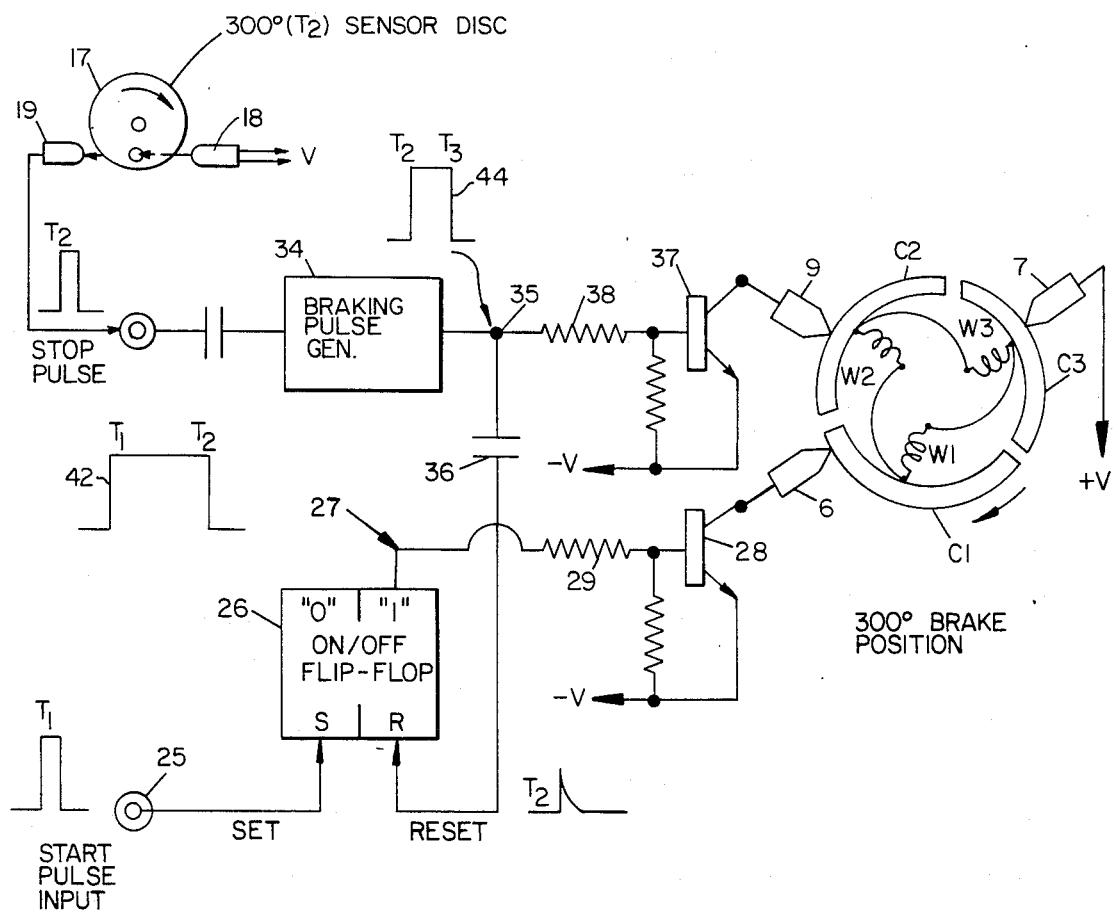
FIG. 6 shows the simple three state intermittent drive circuit, which does not require reversal of polarity for braking.

The basic components of the synchronized drive circuit are shown in FIGS. 4A and 4B, and FIG. 6.

Figure 7:
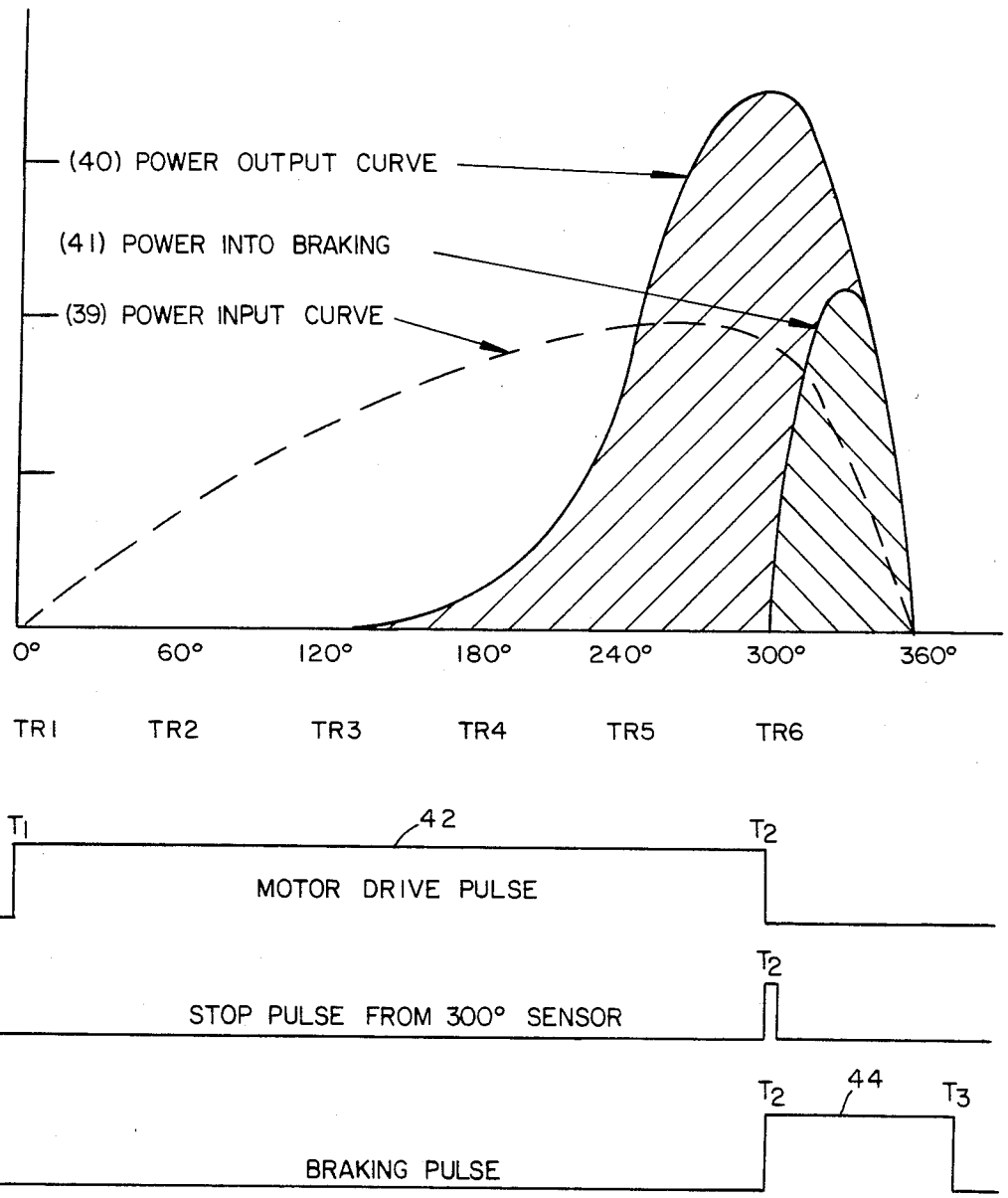
FIG. 7 is a Timing diagram showing the relationship of power curves and the switched current waveforms, to the rotational transition points and degrees of rotation.

Some of the timing waveforms are also shown, as related to the power curves, in FIG. 7.

The self timing drive circuitry is made simple by the fact that there are no polarity changes in switching from the RUN mode to the STOP mode. Two NPN transistor switches 28 and 37 are normally OFF when the motor armature commutator 30 is in the STOP position, as shown. The transistor switch 28, which conducts contact 6 to ground or −V is controlled by the ON/-OFF flip-flop circuit 26 which, in turn, is SET by the START PULSE at the input 25. When the ON/OFF flip-flop 26 is set by the START PULSE the "1" output drives the switch 28 into conduction, which then starts the motor 11 into normal rotation until it reaches 300°, or six commutator transitions (TR1, TR2, TR3, etc.), where a STOP pulse T2 is picked up by, for example, a photo diode 19 from a light emitting diode 18 through an aperture at 300° on the rotating disc 17, which is attached to the external motor shaft 5.

This STOP pulse T2 triggers a Pulse generator 34 which produces a braking pulse from time T2 to T3 at the output 35.

The T2 to T3 pulse drives the transistor switch 37 into conduction through the motor brush contact 9, while simultaneously RESETTING the START/-STOP flip-flop 26 through the capacitor 36, which cuts off the transistor switch 28.

The braking pulse (T2−T3) is made sufficiently along to always allow the armature to come to a complete stop, after a small overshoot, and return to the 360° STOP position; at which time the switch 37 is turned OFF; so that both switches are normally OFF.

The T2 STOP pulse, at 300° of rotation, can be picked up by various methods, as shown in FIGS. 4A and 4B. In FIG. 4A the leaf spring assembly 15, with contacts 13 and 14, rides on the small timing cam 12 which is attached to the motor shaft 5. The cam 12 is shown at the 300° point where the contacts 13 and 14 will conduct and produce the timing pulse T2.

A more sophisticated position sensing method is shown in FIG. 4B where an opaque disc 16 has a hole 17 which is in allignment with the photo diode 19 and the emitter diode 18 when the disc is at 300° of rotation of the motor shaft 5.

FIGS. 4B and 5 have diagramatic views of a mechanism operated by the invention. A cam 20 is connected to the motor shaft 5. A piston or actuator 21, which is spring loaded by spring 22, engages the cam 20 and is reciprocated by the cam spring. The cam 20 is set on the shaft 5 so that its high point is about 270° and nearly alligned with the 300° hole 17 on the disc 16. In FIG. 5 the full line position of cam 20 is the start point and the dotted line position is its peak position at about 270° of rotation in a clockwise direction. In the start position of the cam 20 the actuator 21 is in its rest position indicated at 23. At the high point of the cam 20 the actuator 21 is in its drive position indicated by dotted lines 24. The actuator 20 can be used as a drive means for a fluid pump of the kind shown in my copending application Ser. No. 836,503 filed 3/5/86 and entitled IV Drip Chamber with Built-in Pump Activated by External Means.

The closed loop feedback system has the feature of braking at the correct position of rotation, regardless of varying load conditions on the output cam 20, as shown in FIG. 5.

DESCRIPTION OF POWER CURVES

FIG. 7 shows the curves of the power INTO the motor related to the power TAKEN OUT by the load and braking; which stabilizes the motor position after most of the energy has been removed from the rotating armature by the load. The intregrated area under the power input curve 39 is approximately equal to the area under the the power output curve to the load 40, plus the area of the braking curve 41. The power that is needed during the braking period, that starts at 300°, need only be sufficient to cancel the inertial energy that is left over after the external load has drained the stored energy in the area of 240 to 300 degrees of rotation, as shown by the power output curve 40.

In FIG. 7 the power curves are also related to the switching points of the commutator plates (C1, C2, C3) at each 60° transition point (TR1 thru TR6). Also, the electrical timing pulses, such as the Motor Drive Pulse 42, from time T1 to T2, and the braking pulse 44, from time T2 to T3, are shown in relation to the Power Curves and Commutator transitions.

The miniature three pole D.C. motor becomes an ideal actuator, in combination with the invention, because, first, it has a high efficiency from the small air gap between the armature poles (P1−P3) and the face of the field magnets 1A and 1B; and, second, the armatures are made with laminations for low hysteresis loses. Third, the D.C. motor has its maximum stall torque at the begining of the six step cycle, when it has just started to move. In addition, the rotary armature has the ability to build up stored energy, which can be used in a single concentrated push, by use of a suitable cam action near the end of the cycle, the latter contributing to the stopping of the single rotary cycle. When combined with the invention, the miniature motor proves suitable for applications requiring silent impulse drive and equally silent magnetic braking.

As an example of the efficiency of the new actuator device—a small D.C. motor only ¾ inch long and ½ inch wide, when utilized in the manner described in this invention, can produce a silent mechanical movement of 3/16 inch, with over one half pound of force. With typical impulses occuring once per second, the average power required is less than 0.1 watt.

In summary: This invention, which utilizes readily obtainable precision parts from the high volume "toy" D.C. Motor industry, provides a unique and highly efficient single turn impulse drive actuator; for small devices which require long life, silent operation, and very low average power drain.

I claim:

1. In a D.C. motor having: (a) a pair of north and south field poles; (b) an armature including first, second, and third armature poles; (c) first, second, and third windings respectively on the armature poles; (d) three commutator plates; (e) a pair of brushes; and (f) a third brush positioned at an angle substantially 60° to one of said brushes;

the method of rotating and stopping the rotation of the armature of said motor comprising the steps of:
supplying current to windings on the first, second, and third armature poles so that the armature turns; and
when the armature has assumed a rotary position wherein the first armature pole is adjacent to one of the field poles and the second and third armature poles are adjacent the other field pole, controlling the current flow in the first winding on the first armature pole so that the first armature pole has the opposite polarity as said one field pole and is, therefore, attracted thereto and simultaneously controlling the current flow in the second and third windings on the second and third armature poles so that the second and third armature poles are of the opposite polarity as said other pole and, therefore, are attracted thereto, said attraction stopping the rotation of the armature.

2. In a conventional three-pole D.C. motor having: (a) a pair of north and south field poles; (b) an armature including first, second, and third armature poles; (c) first, second, and third windings respectively on the armature poles; (d) three commutator plates; and (e) a pair of brushes, the improvement which comprises a third brush positioned at an angle substantially at 60° to one of said brushes and positioned to contact the commutator plates, the third brush being for use in stopping the rotation of the armature.

3. A control device comprising:
a three-pole D.C. motor having: (a) a pair of north and south field poles; (b) an armature including first, second, and third armature poles; (c) first, second, and third windings respectively on the armature poles; (d) three commutator plates; (e) first and second brushes; and (f) a third brush positioned at an angle substantially at 60° to one of said brushes;

said control device further including sensor means connected to said armature which, produces an output only at a predetermined rotational position of the armature;

circuit means connected to said first, second, and third brushes, and being operative alternatively as follows:
(a) to supply power to said first and second brushes and no power to said third brush to cause the armature to turn;
(b) when said sensor means functions to produce an output to supply, over a period of time, power to said third brush and to said first brush and no power to said second brush to stop the turning of said armature;
(c) to cut off power to each of said brushes; and means connected to said armature and moved by the rotation of the armature for use as a driver element.

* * * * *